US011511175B2

(12) United States Patent
Metzer et al.

(10) Patent No.: US 11,511,175 B2
(45) Date of Patent: Nov. 29, 2022

(54) BASEBALL PITCHING MACHINE, SYSTEM AND METHOD (71) Applicant: High Noon Technologies Inc., Warminster, PA (US)

(72) Inventors: John Metzer, Furlong, PA (US); Thomas Noonan, Ardmore, PA (US)

(73) Assignee: HIGH NOON TECHNOLOGIES INC., Ardmore, PA (US)

( * ) Notice: Subject to any disclaimer, the term of this patent is extended or adjusted under 35 U.S.C. 154(b) by 494 days.

(21) Appl. No.: 16/748,007

(22) Filed: Jan. 21, 2020

(65) Prior Publication Data

US 2020/0230484 A1    Jul. 23, 2020

Related U.S. Application Data (60) Provisional application No. 62/908,254, filed on Sep. 30, 2019, provisional application No. 62/794,883, filed on Jan. 21, 2019.

(51) Int. Cl.
*A63B 69/40*       (2006.01)
*A63B 69/00*       (2006.01)
*G05B 15/02*       (2006.01)
*A63B 65/12*       (2006.01)

(52) U.S. Cl.
CPC ............ *A63B 69/409* (2013.01); *A63B 65/12* (2013.01); *A63B 69/0002* (2013.01); *G05B 15/02* (2013.01); *A63B 2069/0008* (2013.01); *A63B 2069/401* (2013.01); *A63B 2069/402* (2013.01); *A63B 2220/56* (2013.01)

(58) Field of Classification Search
CPC .................. A63B 69/409; A63B 65/12; A63B 2069/0008; A63B 2069/402
USPC ........................................... 124/56
See application file for complete search history.

(56) References Cited

U.S. PATENT DOCUMENTS

| 2,526,018 | A | * | 10/1950 | Foster | ................. | A63B 69/409 |
| | | | | | | 124/73 |
| 3,288,127 | A | * | 11/1966 | Bullock | ............... | A63B 69/409 |
| | | | | | | 124/81 |
| 3,467,073 | A | * | 9/1969 | Rhodes | ................ | A63B 69/409 |
| | | | | | | 124/75 |
| 3,604,409 | A | | 9/1971 | Doeg | | |
| 3,662,729 | A | * | 5/1972 | Henderson | ........... | A63B 69/409 |
| | | | | | | 124/81 |
| 3,724,437 | A | | 4/1973 | Halstead | | |
| 3,757,759 | A | | 9/1973 | Haworth | | |
| 3,815,567 | A | | 6/1974 | Serra | | |
| 4,197,827 | A | | 4/1980 | Smith | | |
| 4,323,047 | A | | 4/1982 | Mcintosh et al. | | |

(Continued)

*Primary Examiner* — Mitra Aryanpour
(74) *Attorney, Agent, or Firm* — Clark Hill PLC; James R. Foley (57) ABSTRACT A baseball pitching machine that is configured to precisely index and spin a baseball before pitching the baseball. The machine comprises a baseball spinner and launcher that is configured to spin the baseball using at least one spindle, and then launch or pitch the ball using air (i.e., pneumatic). Preferably, the position of the ball spinner and launcher can be adjusted in terms of position in both the x and y directions (i.e., both side to side, and up and down), as well as its angle. The baseball pitching machine is configured to be controllable such that pitches (in terms of type, location and velocity) can be changed on a pitch-by-pitch basis.

12 Claims, 11 Drawing Sheets (56) References Cited

U.S. PATENT DOCUMENTS

| | | | |
|---|---|---|---|
| 4,372,284 A | 2/1983 | Shannon et al. | |
| 4,423,717 A | 1/1984 | Kahelin | |
| 4,524,749 A | 6/1985 | Giovagnoli | |
| 4,583,514 A | 4/1986 | Nozato | |
| 4,655,190 A | 4/1987 | Harris | |
| 4,922,885 A | 5/1990 | Iwabuchi et al. | |
| 5,125,653 A | 6/1992 | Kovacs et al. | |
| 5,195,744 A | 3/1993 | Kapp et al. | |
| 5,464,208 A | 11/1995 | Pierce | |
| 5,771,621 A * | 6/1998 | Rogers | A63B 69/409 124/56 |
| 6,182,649 B1 * | 2/2001 | Battersby | A63B 69/406 124/78 |
| 2020/0230484 A1 * | 7/2020 | Metzer | A63B 69/409 124/78 |

* cited by examiner

BASEBALL PITCHING MACHINE, SYSTEM AND METHOD

RELATED APPLICATION (PRIORITY CLAIM)

This application claims the benefit of U.S. Provisional Application Ser. No. 62/794,883, filed Jan. 21, 2019, and U.S. Provisional Application Ser. No. 62/908,254, filed Sep. 30, 2019, which are hereby incorporated herein by reference in their entirety.

BACKGROUND

The present invention generally relates to baseball pitching machines, systems and methods, and more specifically relates to a baseball pitching machine, system and method that orients and spins a baseball with precision before pitching the baseball.

Pitching and ball-throwing machines generally fall into four categories: (1) machines that employ a spring actuated arm mechanism to propel the ball (disclosed, for example, in U.S. Pat. Nos. 3,757,759 and 4,524,749); (2) machines that employ at least one rotating wheel or a pair of rotating, co-acting wheels to propel the ball (disclosed, for example, in U.S. Pat. Nos. 3,288,127; 3,604,409; 3,724,437; 3,815,567; 4,197,827; 4,323,047; 4,372,284; 4,423,717; 4,583,514; 4,655,190 and 4,922,885); (3) machines that rely on pneumatic pressure to propel the ball; and (4) machines that employ converging and diverging rotatable discs to propel the ball.

Typically, all four of these types of machines are relatively cost effective and simple to use. However, regarding machines that employ a spring actuated arm mechanism to propel the ball, typically this type of machine can only throw straight pitches to one location. Since the ball is placed rather than gripped, to the extent one pitch may vary from the next in a given cycle of pitches, this variation is basically accidental and random. The only variations that are typically possible with this type of machine is the height and velocity of the pitch can be changed before each cycle of pitches. Specifically, the machine must be stopped in terms of pitching balls, the machine can be adjusted to change the height and velocity of the next set of pitches to be pitched, and then the machine can be re-started in terms of throwing balls again.

Regarding machines that employ at least one rotating wheel or a pair of rotating, co-acting wheels to propel the ball, these types of machine do not control ball orientation and must be spinning perfectly synched for the ball to propel straight. Error is also introduced when contact between the ball and the rotating wheels is different due to wheel surfaces, or when the wheels have different amounts of inflation. With regard to machines that employ more than one rotating wheel, the introduction of additional wheels beyond the first wheel introduces additional error and presents the difficulty of controlling the spinning of one wheel relative to the other(s).

Regarding machines that rely on pneumatic pressure to propel the ball and machines that employ converging and diverging rotatable discs to propel the ball, these types of machines do not control or orient the ball before the ball is propelled from the machine.

None of the four (4) types of machines mentioned can be used to replicate specific pitches by using pitch data relating to, for example, trajectory, spin, movement, and/or velocity, and definitely not on a pitch-by-pitch basis within a given cycle of pitches.

Several companies have developed pitch/hit software applications where the user wears a virtual reality ("VR") headset or in Computer Assisted Virtual Environment (CAVE), but they all lack the true feedback of hitting a real baseball. Pure virtual systems lack the instant feedback and muscle memory components of actually hitting a real baseball.

The concept of programming a pitching machine to deliver a variety of different pitches has been discussed in prior patents, for example in U.S. Pat. Nos. 5,125,653 and 5,464,208. Both of these patents disclose machines that are of the two-wheel type and are incapable of rapid change in order to interchangeably deliver a variety of different pitches on a pitch-by-pitch basis.

The marriage of a ball-throwing machine with a video display of a pitcher is described in, for example, U.S. Pat. No. 5,195,744. Such a device, however, fails to be able to deliver a variety of different pitches on a pitch-by-pitch basis. The synchronization means of such a device relies upon an audio signal generated by the video, without any regard to the status of the ball in the queued position before being pitched. Furthermore, the ball queuing system of this device relies on gravity and is imprecise and subject to failure. The release point of this device is fixed and does not effectively replicate different pitchers.

SUMMARY

An object of an embodiment of the present invention is to provide a baseball pitching machine that is configured such that pitch data is used to replicate specific pitches.

Another object of an embodiment of the present invention is to provide a baseball pitching machine that is configured such that release point, pitch type, speed, movement and location can be readily changed from pitch-to-pitch.

Still another object of an embodiment of the present invention is to provide a baseball pitching machine that is configured to directly and proactively use pitch data in a live training session.

Briefly, an embodiment of the present invention provides a baseball pitching machine that is configured to precisely orient and spin a baseball before pitching the baseball. The machine comprises a baseball spinner and launcher that is configured to spin the baseball using at least one spindle, and then launch or pitch the ball using air (i.e., pneumatic). Preferably, the position of the ball spinner and launcher can be adjusted in terms of position in both the x and y directions (i.e., both side to side, and up and down), as well as its angle. The baseball pitching machine is configured to be controllable such that pitches (in terms of type, location and velocity) can be changed on a pitch-by-pitch basis.

Preferably, the baseball pitching machine is used as part of an overall system that also comprises a controller configured to control the baseball pitching machine. The system may also comprise a database of pitch data that the controller uses to determine how to control the baseball pitching machine in terms of pitch spin, launch velocity, etc. The system may also, or in the alternative, comprise a data entry tool which a user can use to input pitch data either into the database or directly to the controller.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF AN ILLUSTRATED EMBODIMENT

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

Figure 1:
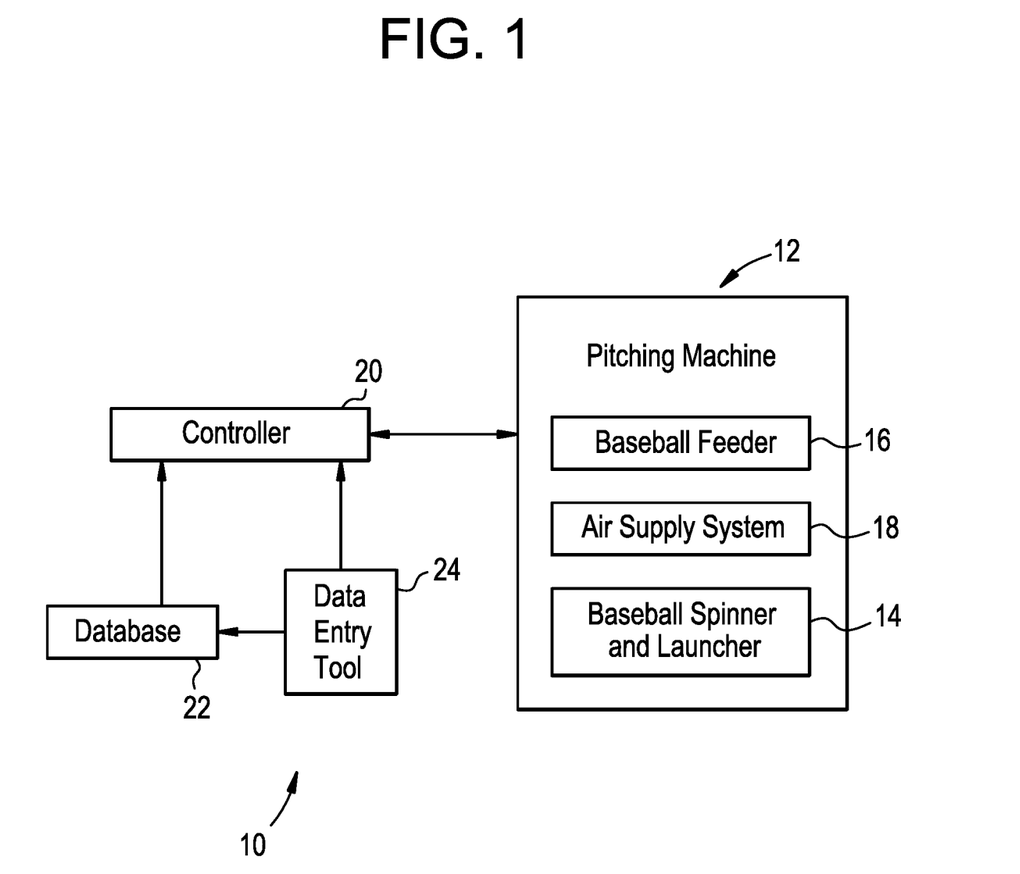
FIG. 1 is a block diagram of a system that employs a baseball pitching machine that is in accordance with an embodiment of the present invention.

FIG. 1 is a block diagram of a system 10 that employs a baseball pitching machine 12 that is in accordance with an embodiment of the present invention. As shown, the baseball pitching machine 12 comprises a baseball spinner and launcher 14 as well as a baseball feeder 16 that feeds baseballs to the baseball spinner and launcher 14. An air supply system 18 is provided for supplying air to the baseball spinner and launcher 14 and also the baseball feeder 16. A controller 20 is in communication with, and effectively controls, the baseball pitching machine 12. Preferably, the controller 20 has access to a database 22 of pitch data. In addition, or in the alternative, a data entry tool 24 (such as a keyboard, etc.) can be used to add data to the database 22 or to feed data directly to the controller 20. Regardless, control of the baseball pitching machine 12 depends on the data received by the controller 20. Specifically, the data effectively defines certain settings of the baseball pitching machine 12 before a pitch, as well as the angle and spin rate of the baseball, release point of the pitcher, and the speed of the pitch of the baseball from the baseball pitching machine 12. All this will be explained in more detail herein as the other Figures are explained.

Figure 2:
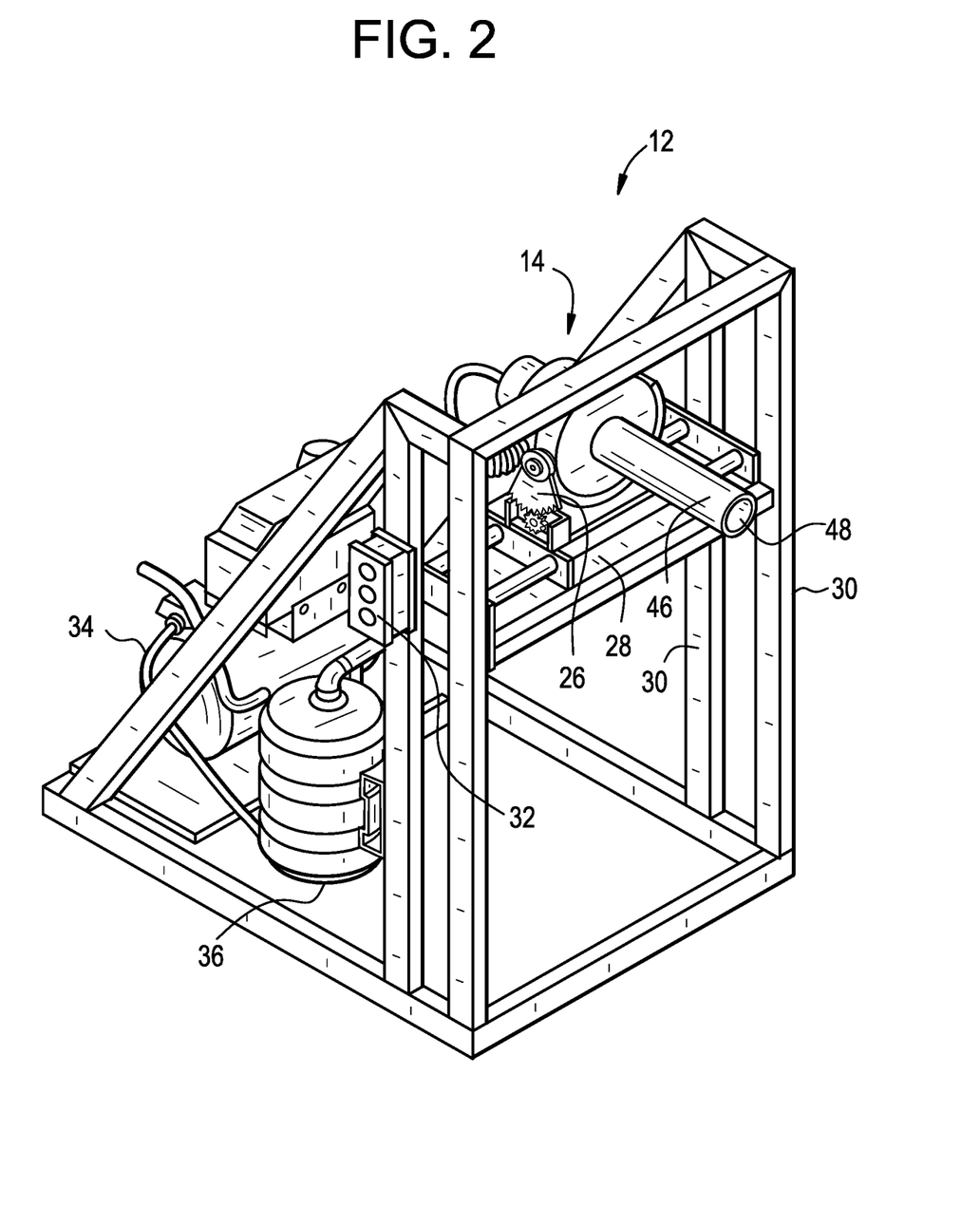
FIG. 2 provides a front perspective view of the baseball pitching machine.
Figure 3:
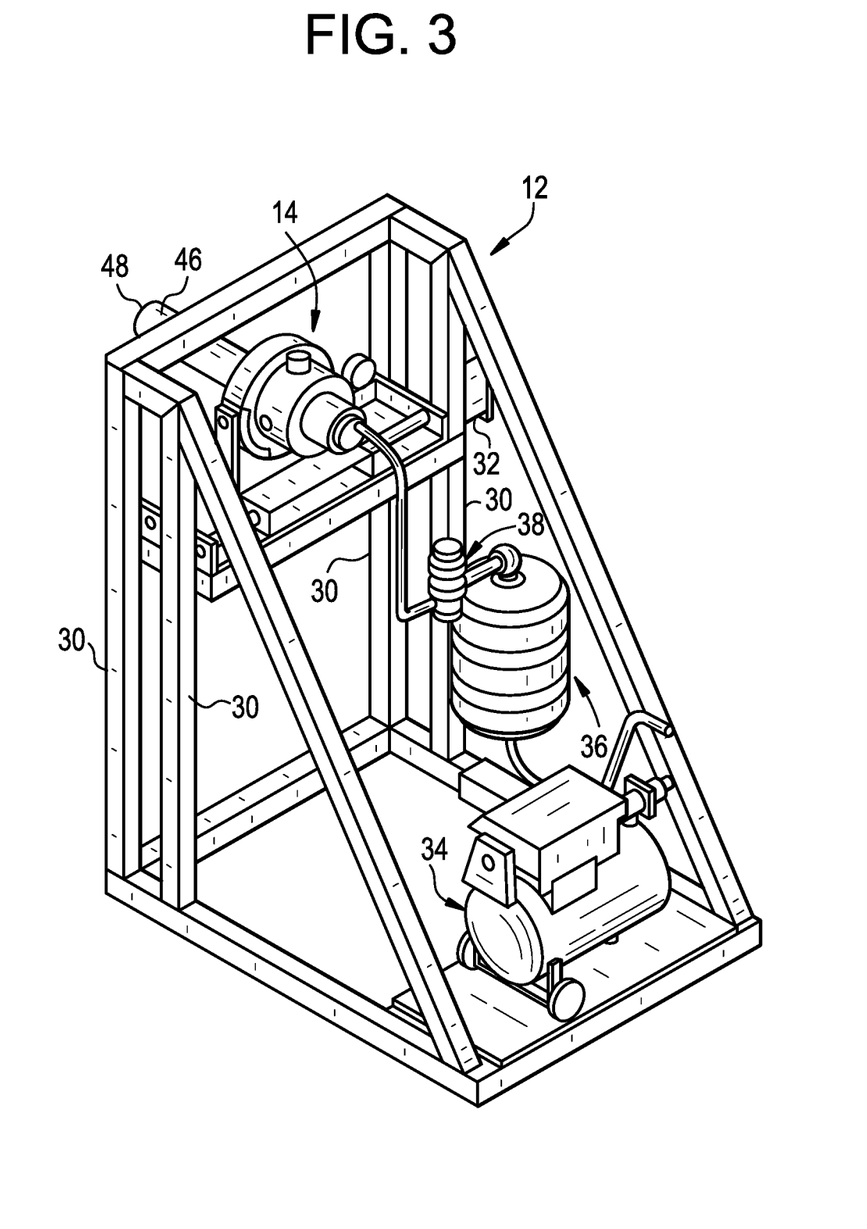
FIG. 3 provides a rear perspective view of the baseball pitching machine.
Figure 4:
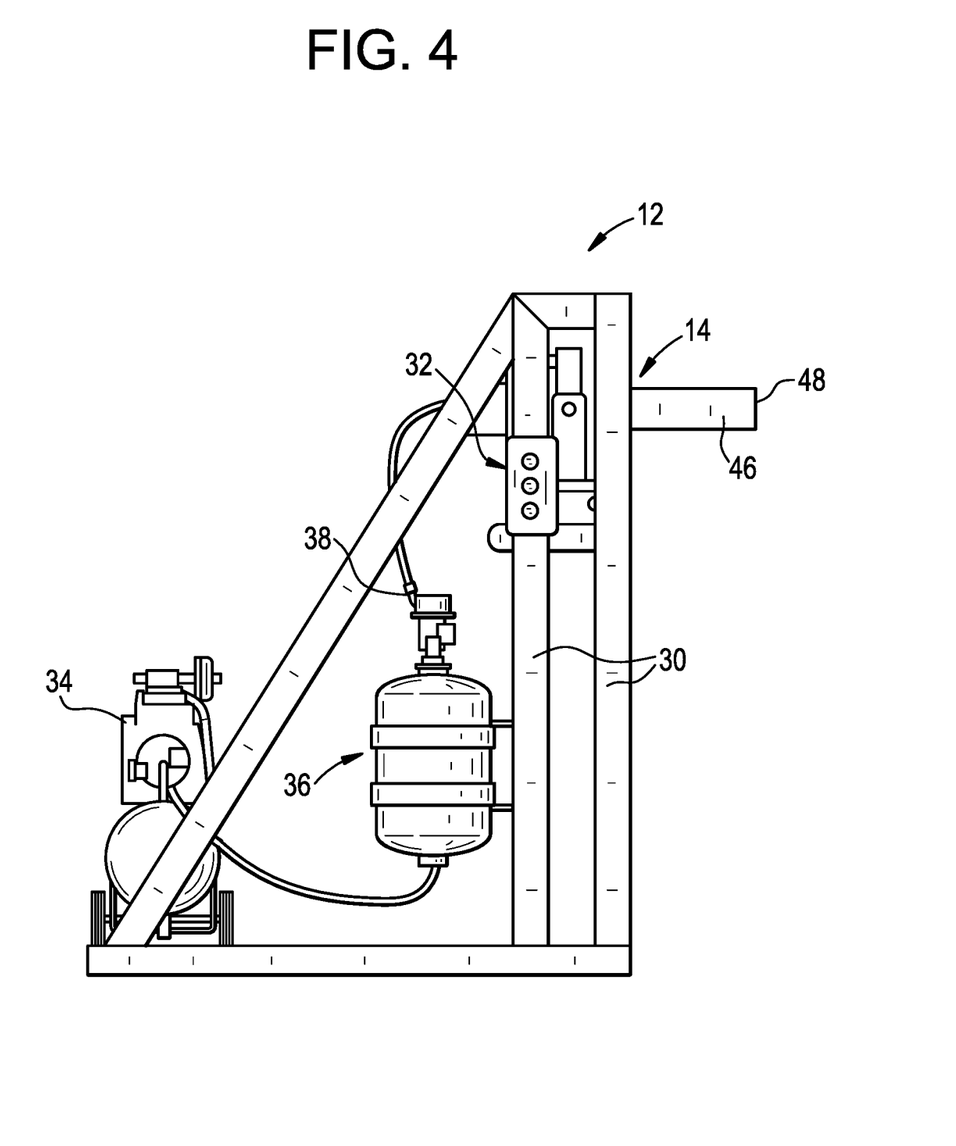
FIG. 4 provides a side view of the baseball pitching machine.
Figure 5:
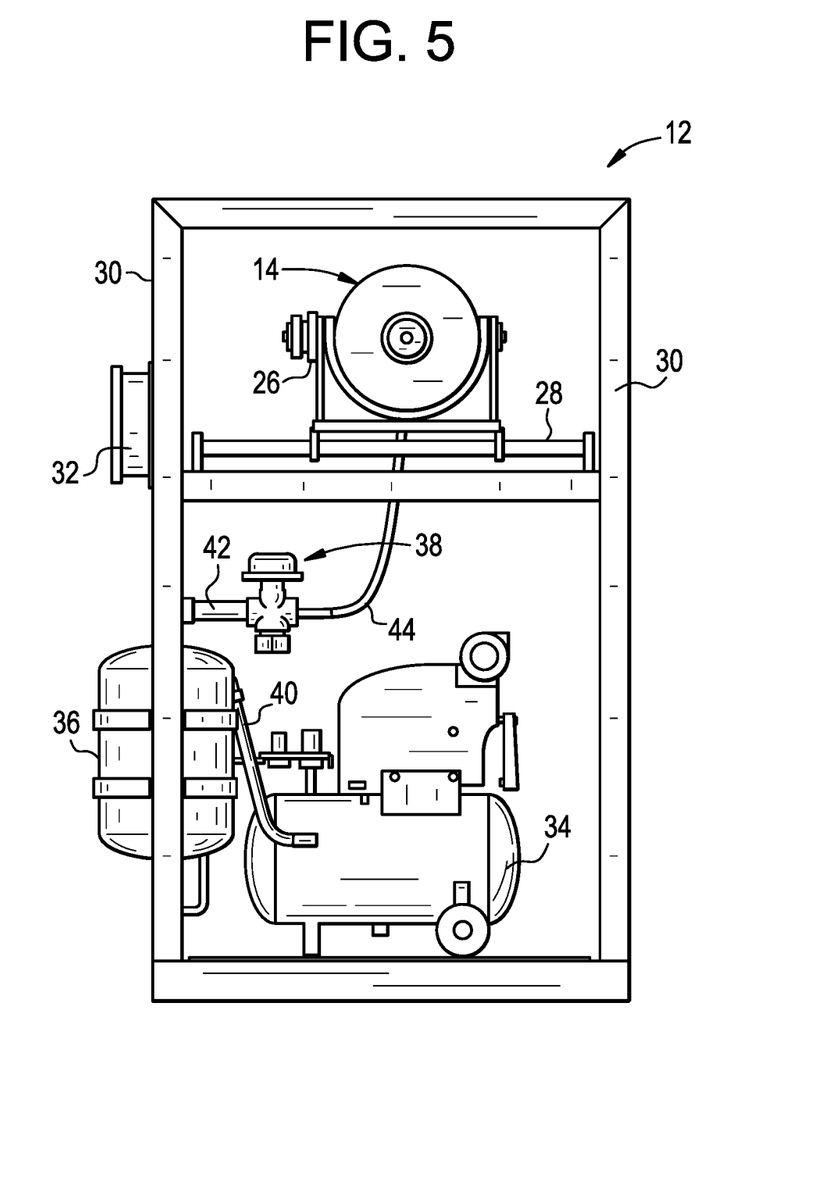
FIG. 5 provides a front view of the baseball pitching machine.

FIG. 2 provides a front perspective view of the baseball pitching machine 12, while FIG. 3 provides a rear perspective view, FIG. 4 provides a view, and FIG. 5 provides a front view. For clarity, all these views omit the baseball feeder 16, but the baseball feeder 16 will be described more fully later herein.

As shown in FIGS. 2-5, the baseball spinner and launcher 14 are mounted on a pitch gear 26 that, in turn, is mounted on a rotary table 28. Preferably, the rotary table 28 is mounted on vertical rails 30 and is driven by a lead screw/linear actuator. A control box 32 may be provided on the baseball pitching machine 12 for controlling the position of the baseball spinner and launcher 14 relative to the vertical rails 30 (i.e., in the up and down direction, depending on the height of the batter, as well as possibly also side to side).

The air supply system 18 of the baseball pitching machine 12 may comprise, for example, an air compressor 34, an air receiver/canister 36, and a fast-acting poppet valve 38. In addition, as best viewed in FIG. 5, there is an air line 40 going from the air compressor 34 to the air receiver/canister 36, an air line 42 going from the air receiver/canister 36 to the fast-acting poppet valve 38, and an air line 44 going from the fast-acting poppet valve 38 to the baseball spinner and launcher 14. In operation, the air compressor 34 supplies air to the air receiver/canister 36, and air from the air receiver/canister 36 is supplied to the baseball spinner and launcher 14 and also the baseball feeder 16 depending on precise control of the fast-acting poppet valve 38 by the controller 20.

Figure 6:
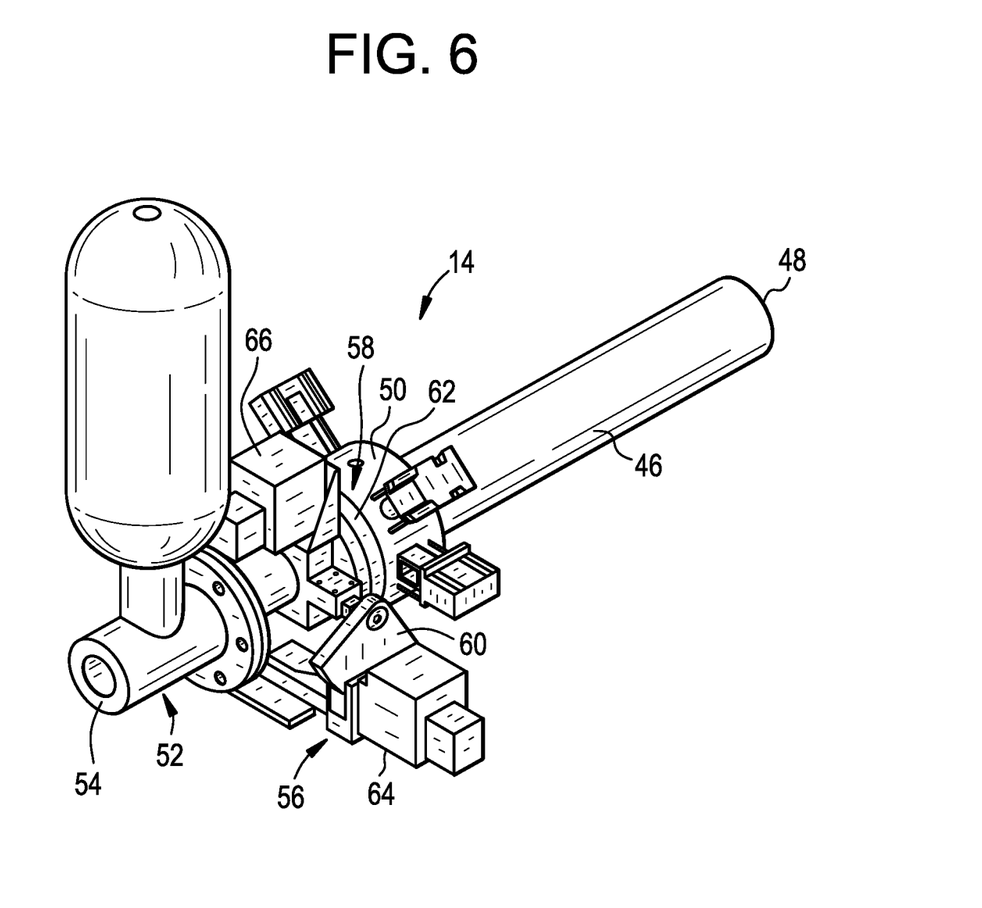
FIG. 6 shows a baseball spinner and launcher of the baseball pitching machine.

FIG. 6 shows the baseball spinner and launcher 14 isolated. As shown, the baseball spinner and launcher 14 comprises a barrel or core 46 which is hollow and which is configured to receive a baseball into its end (i.e., from the baseball feeder 16) and is configured to pitch the baseball out of its end 48. The barrel or core 46 extends from a core housing assembly 50 that will be described in more detail later hereinbelow. At the opposite end of the barrel or core 46 is an air unit 52. The air unit 52 has an end 54 that is configured to receive air ultimately from the air receiver/canister 36 depending on precise control of the fast-acting poppet valve 38 (i.e., by the controller 20).

The baseball spinner and launcher 14 also preferably includes two gear mechanisms 56, 58—one gear mechanism 56 for changing the rotational angle of the baseball spinner and launcher 14 (i.e., gear mechanism 56 is the rotary indexer 26 mentioned previously), and another gear mechanism 58 for changing the pitch angle at which the barrel or core 46 of the baseball spinner and launcher 14 points. Both gear mechanisms 56, 58 preferably include gears 60, 62 that mesh with spur gears (not specifically shown) that are driven by servo motors 64, 66 that are controlled by the controller 20.

Figure 7:
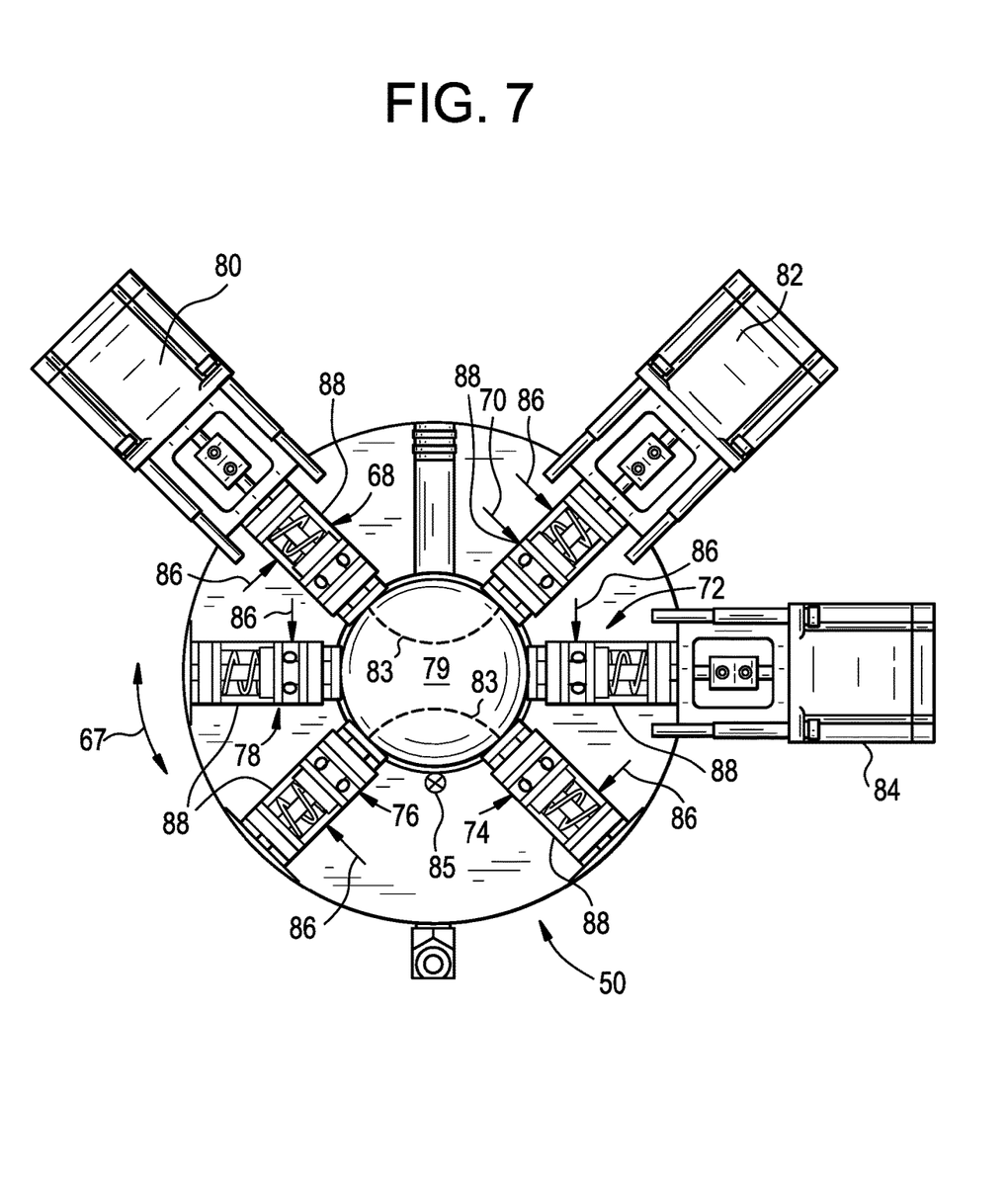
FIG. 7 provides a partial cross-sectional view of a core housing assembly of the baseball pitching machine.

FIG. 7 provides a partial cross-sectional view of the core housing assembly 50. As shown, the core housing assembly 50 includes a plurality of spindle assemblies 68, 70, 72, 74, 76, 78. All of the spindle assemblies 68, 70, 72, 74, 76, 78 have spindles that extend or close and retract (i.e., in/out) by pneumatic pressure (i.e., under control of the controller 20) in order to engage (i.e., contact) or disengage a baseball 79 within the core housing assembly 50. To this end, air ports are provided within the core housing assembly 50, and said air ports are represented by arrows 86 in FIG. 7. These air ports 86 feed air to bores 88 in which the spindle assemblies 68, 70, 72, 74, 76, 78 are disposed in the core housing. The rotary indexer 26, mentioned previously, rotates the core housing assembly 50 to a desired position (represented by double arrowed line 67 in FIG. 7) before indexing the baseball and launching the pitch.

While some of the spindle assemblies 68, 70, 72 have spindles that are driven (i.e., rotated) by servo motors 80, 82, 84 (under control of the controller 20), other spindle assemblies 74, 76, 78 have spindles that are not (i.e., they are idlers). Any of the spindle assemblies 68, 70, 72 that are driven by a servo motor 80, 82, 84 can, in addition to being extended and retracted using air, can have their spindles spun by their associated servo motors 80, 82, 84 to rotate the baseball 79. Preferably, some spindle assemblies 68, 70, 74, 76 are used to position or index the baseball 79 and the rest of the spindle assemblies 72, 78 are used to rotate the baseball at a high rate of speed once the baseball has been positioned or indexed to the desired position. Herein, the spindle assemblies 68, 70, 74, 76 that are configured to index the baseball before the baseball is spun at a high rate of speed are called "indexers," while the spindle assembles 72, 78 that are configured to thereafter spin the baseball at a high rate of speed are called "spinners." Preferably, the controller 20 uses the indexers to index the baseball 79 such that when the spinners 72, 78 are extended to contact the baseball and spin the baseball, the spinners 72, 78 do not contact the seams of the baseball. Spinning the baseball while contacting the seams is not beneficial because if the spinners 72, 78 grab the baseball 79 across the seams 83, the baseball has a tendency to slip. Preferably, a sensor (represented by reference numeral 85 in FIG. 7) is provided inside the core housing that senses the seams of the baseball or "sees" the baseball and compares what is "seen" to baseball image data, and reports back to the controller 20 such that the controller 20 can operate the indexers 68, 70 74, 76 to correctly contact and index the baseball before using the spinners 72, 78 contact and spin the baseball.

In operation, the controller causes all four indexers 68, 70, 74, 76 to extend (i.e., using air) thereby engaging and centering the baseball 79. Then, the controller 20 retracts a first pair of indexers (i.e., one driver 70 and one corresponding idler 76), while a second pair of indexers (i.e., one driver 68 and one corresponding idler 74) is left in contact with the baseball 79. The controller 20 then uses the second pair of indexers 68, 74 to index (i.e., rotate) the baseball 79 relative to the seams 83. At this point, the baseball 79 is in a good position relative to the seams 83, ready to be spun by the spinners 72, 78. As such, the controller 20 extends the spinners 72, 78, retracts the indexers 68, 70, 74, 76, and uses the spinners 72, 78 to spin the baseball 79 to a desired spin rate (i.e., depending on the data in the database 22 and/or as set by the data entry tool 24). Once the spinners 72, 78 have spun the baseball 79 to the desired spin rate, the controller 20 opens the air valve 38 and retracts the spinners 72, 78. Preferably, the controller 20 retracts the spinners 72, 78 while the baseball 79 is spinning in the air and moving forward as this results in a controlled pitch of the baseball out of the machine 12. Having the spinners 72, 78 release the baseball 79 too soon or too late could result in the baseball 79 not firing out of the machine 12 straight, the baseball bouncing in the core housing 50, the baseball 79 sticking to one or more of the spinners 72, 78, etc., any of which can effect baseball flight and spin. With regard to pitching the baseball out of the machine, preferably the velocity is controlled by the controller 20 and is highly accurate via air pressure. Preferably, the controller 20 reads a pressure sensor on the air canister 36, sets a specific pressure for the pitch and then bleeds it off in short bursts to the exact p.s.i. which fills the cavity behind the baseball 79 and pushes the baseball resulting in a precise speed of launch out of the barrel 46 without effecting the baseball spin.

Figure 8:
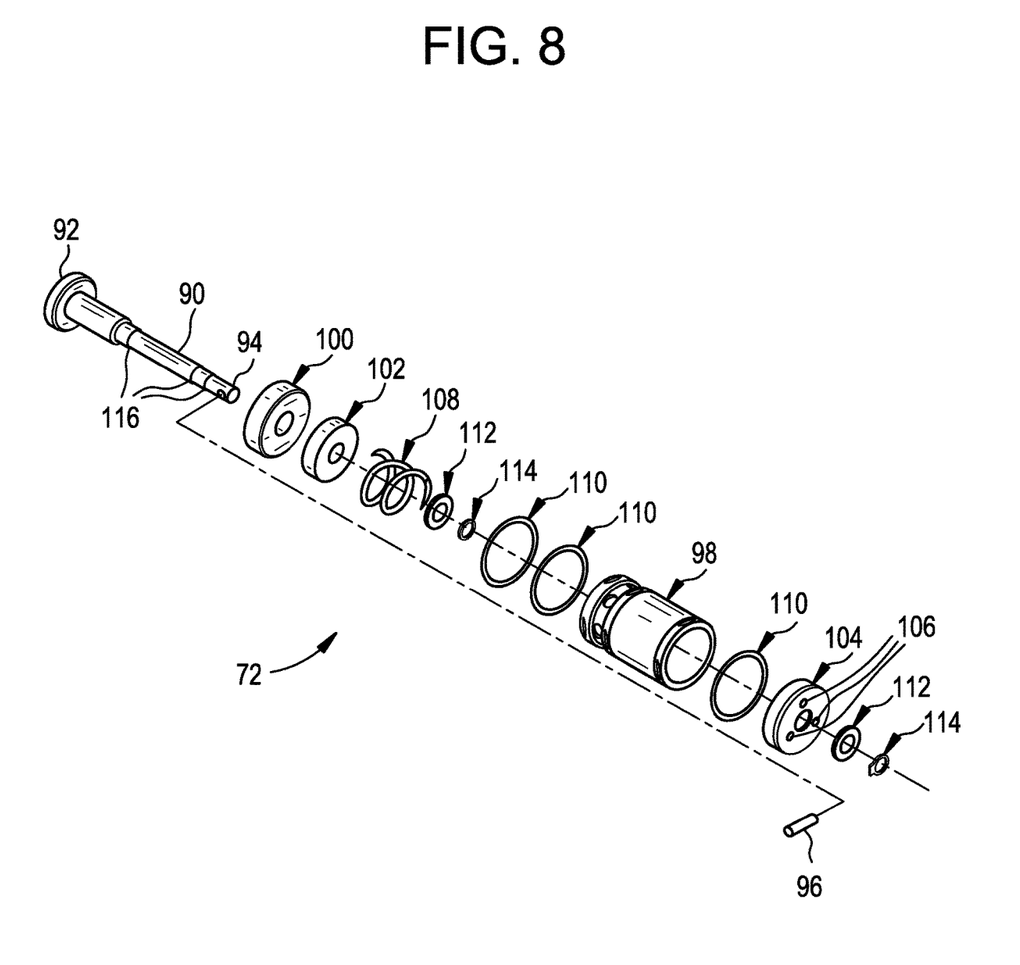
FIG. 8 provides an exploded perspective view of a spinner that is driven by a servo motor.
Figure 9:
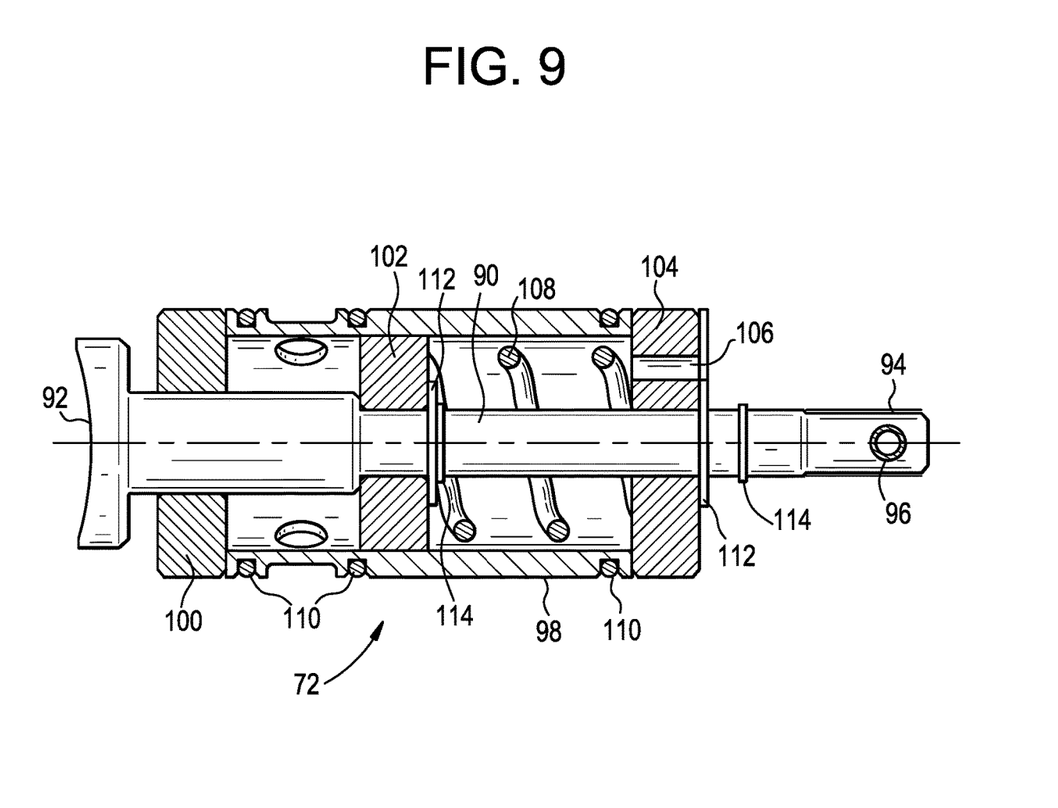
FIG. 9 provides a side, cross-sectional view of the spinner.

FIG. 8 provides an exploded perspective view of the spinner 72 that is driven by servo motor 84, while FIG. 9 provides a side, cross-sectional view of the spinner 72. As shown, the spinner 72 comprises a shaft 90. The shaft 90 has one end 92 configured to contact the baseball and another end 94 that is configured to be pinned (via pin 96) to a rotating shaft of the servo motor 84. The spinner 72 also includes a bearing sleeve 98 and a plurality of bearings 100, 102, 104, wherein bearing 104 is vented in that it includes holes 106 for the passage of air. A compression spring 108 is disposed inside the bearing sleeve 98, between bearings 102 and 104. O-rings 110 are provided on the bearing sleeve 98 and these o-rings 110 contact an internal surface of the bore 88 in the core housing 50 in which the spinner 72 is disposed. The spinner 72 also includes washers 112 and retaining rings 114. The retaining rings 114 engage corresponding grooves 116 in the shaft 90.

With regard to the structure and configuration of spinner 78 that is an idler (i.e., not driven by a servo motor), the structure and configuration can be the same as the spinner 72 described previously, with the exception that the shaft 90 need not be as long because it need not have a portion that pins to the rotating shaft of a servo motor.

With regard to the structure and configuration of the indexers 68, 70, 74, 76 the structure and configuration of the indexers 68, 70, 74, 76 can be the same as the spinners 72, 78, with the exception that bearing 100 is preferably provided as being vented instead of bearing 104.

Figure 10:
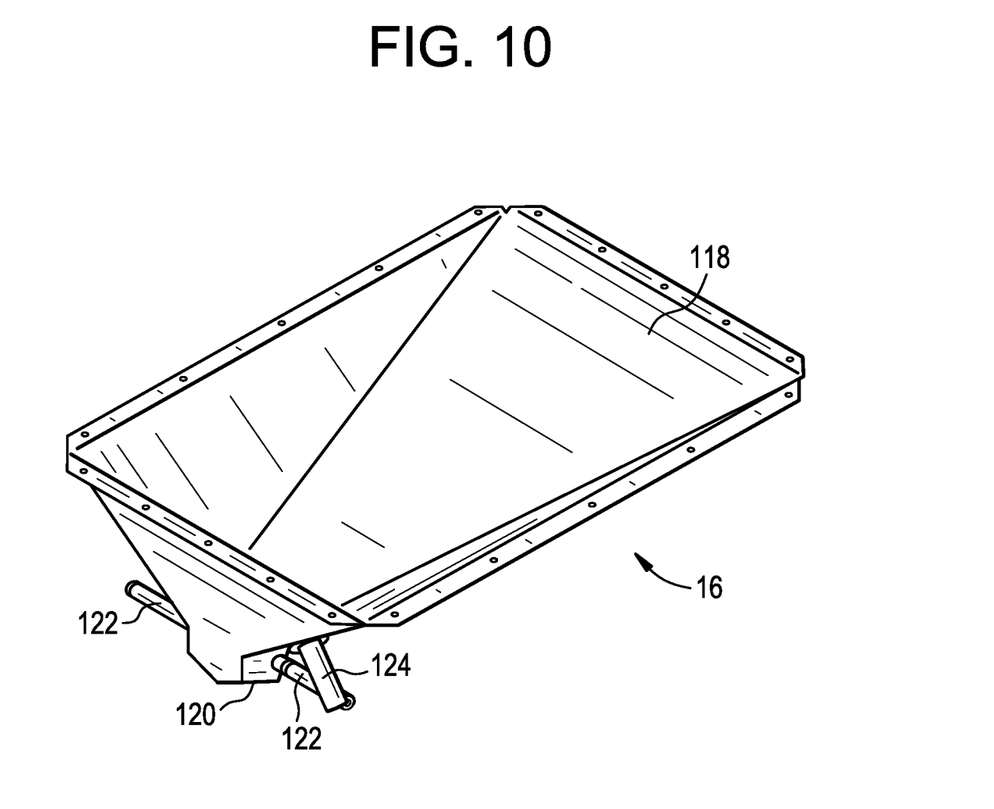
FIG. 10 provides a perspective view of a baseball hopper and feeder of the baseball pitching machine.

With regard to the baseball feeder 16, the baseball feeder 16 may be provided as shown in FIG. 10, having a ball hopper 118 and chute 120, as well as air cylinders 122 and a vibrator 124 wherein the air cylinders 122 and vibrator 124 are all controlled by the controller 20. One or more sensors may be used by the controller 20 to determine when the ball hopper 118 is empty, when balls are stuck (in which case the controller may actuate the vibrator 124), etc. Regardless, preferably the chute 120 is positioned over the baseball spinner and launcher 14 and when another baseball is to be loaded into the baseball spinner and launcher 14, preferably the controller 20 retracts all the spindles 68, 70, 72, 74, 76, 78 (i.e., by not supplying air to them and allowing the springs of the spindle assemblies to do their job), and the gear mechanism 56 is operated to pitch the end 48 of the tube upward, under the chute 120. The controller 20 then operates the air cylinders 122 and/or vibrator 124 to cause the baseball feeder 16 to feed or drop a baseball into the barrel 46, and then the controller 20 operates the gear mechanisms 56, 58 to move the baseball spinner and launcher 14 to the correct position for the next pitch. Subsequently, the controller 20 controls the spindle assemblies 68, 70, 72, 74, 76 as described previously to index the baseball (using spindle assemblies 68, 70, 74, 76) and create the correct spin (using spindle assemblies 72, 78). Finally, the controller 20 uses the air supply system 18 to launch or pitch the baseball out of the machine 12.

Figure 11:
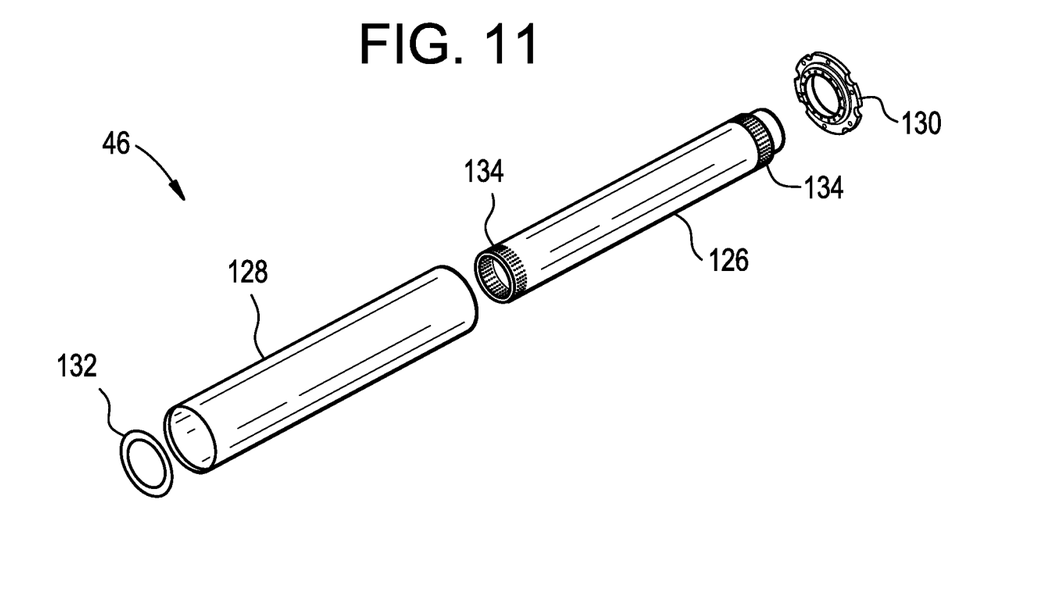
FIG. 11 provides an exploded perspective view of a barrel and inner sleeve of the baseball pitching machine.
Figure 12:
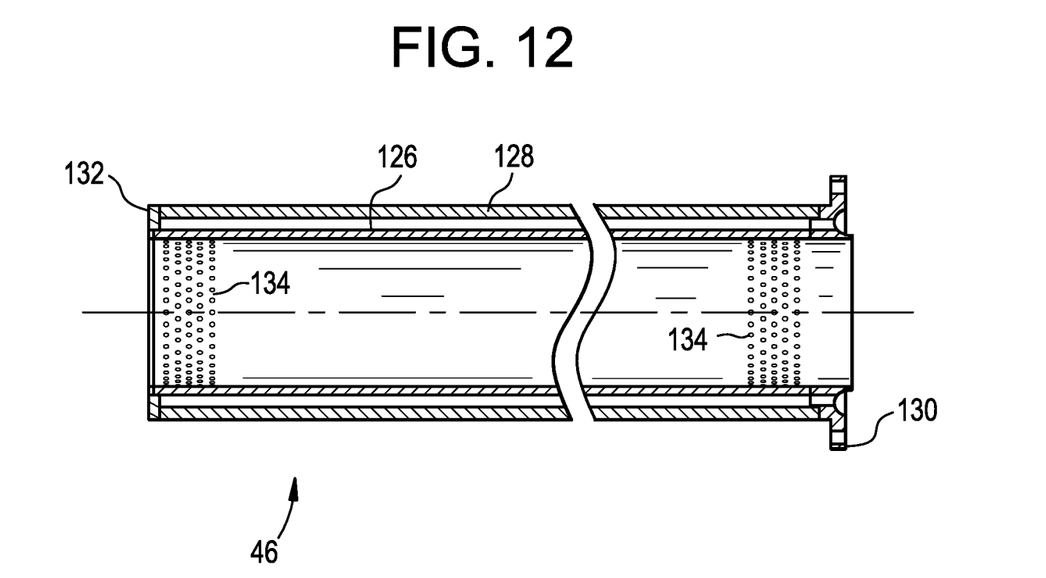
FIG. 12 provides a cross-sectional view of the barrel shown in FIG. 11.

FIG. 11 provides an exploded perspective view of the barrel 46 while FIG. 12 provides a cross-sectional view thereof. As shown, the barrel 46 preferably comprises an inner sleeve 126 and an outer sleeve 128, as well as a flange 130 for mounting the barrel 46, and an end cap 132. Preferably, the inner sleeve 126 is perforated in that it has holes 134. In operation, the barrel 46 is pressurized before firing the baseball. The pressurization creates an air bearing which keeps the baseball from bouncing off the sides of the barrel 46, which would be undesirable because the contact would affect the spin and direction of the baseball. Preferably, the barrel 46 is twenty four inches long, there are rows of holes 134 the length of the inner sleeve 126, and the holes 134 are 0.050 inches in diameter each and are staggered about 0.14 inches apart. However, other configurations are entirely possible while staying fully within the scope of the present invention.

The baseball pitching machine 12 disclosed herein controls and provides the exact initial conditions that prescribe the resultant trajectory including release point, velocity vector (direction, ($\theta$, $\psi$) and speed), ball orientation and spin axis vector (rotational speed—omega, and direction in both planes ($\psi_\omega$ (yaw) and $\varphi$ (roll)). The device can precisely and repeatedly match the initial conditions for any given or desired trajectory within the constraints of the physical system, delivers a precisely controlled velocity vector consisting of the forward velocity and angular direction ($\theta$, theta/pitch and $\psi$, psi/yaw) to the baseball, and provides a precisely controlled trajectory initialization/start point through articulation in the x, y, and z directions. The device provides a precisely controlled rotational speed ($\omega$—omega) on the baseball by imparting a rotational force, with feedback control, through the baseball's desired spin axis. The device provides a precisely controlled spin axis direction consisting of the angle, $\psi$, in the x-y plane and the angle, $\varphi$, in the x-z plane.

The baseball pitching machine 12 disclosed herein is configured such that pitch data is used to replicate specific pitches. Additionally, pitch type, speed and location can be readily changed from pitch-to-pitch. The device provides that pitch data can be directly and proactively used in a live training session. The baseball pitching machine is configured to be controllable such that pitches (in terms of type, location and velocity) can be changed on a pitch-by-pitch basis.

Preferably, the controller is specifically configured (i.e., software is utilized) to convert pitch data into specific commands which are provided to the baseball pitching machine causing the baseball pitching machine to replicate the pitch on which the pitch data is based and to send the pitch to a specified strike zone location.

While the baseball pitching machine 12 has been described as being used with baseballs, the machine can instead be used with other balls, such as twelve inch softballs, golf balls, footballs, etc. As such, the word "baseball" should be broadly interpreted to mean any ball regardless of whether the ball has seams. In addition, while the machine has been mainly characterized herein as being a "pitching' machine meaning balls get fired at a batter, the machine can also be used to launch fly balls to outfielders, pops ups to infielders, etc. As such, the word "pitching" should be broadly interpreted to mean launching as well.

While some sensors have been discussed herein, still more sensors can be provided as being in communication with the controller such as a sensor for identifying the presence of a person in the strike zone, etc.

While a specific embodiment of the invention has been shown and described, it is envisioned that those skilled in the art may devise various modifications without departing from the spirit and scope of the present invention.

What is claimed is:

1. A baseball pitching machine for indexing, spinning and pitching a baseball, said baseball pitching machine comprising a baseball spinner and launcher, said baseball spinner and launcher configured to receive air to pitch the baseball from the baseball pitching machine, said baseball spinner and launcher comprising at least one spindle configured to extend to contact the baseball and configured to retract and disengage the baseball, wherein the spindle is configured to contact, index and spin the baseball and is configured to retract and disengage from the baseball before the baseball is pitched out of the baseball pitching machine using air.

2. A baseball pitching machine as recited in claim 1, wherein the at least one spindle comprises a plurality of spindles which are separately extendable and retractable.

3. A baseball pitching machine as recited in claim 1, wherein the at least one spindle comprises at least one pair of spindles, wherein a first spindle of the pair is driven and a second spindle of the pair is an idler.

4. A baseball pitching machine as recited in claim 1, wherein the at least one spindle comprises a plurality of spindles, wherein at least one of the plurality of spindles indexes the baseball and wherein at least one of the plurality of spindles spins the baseball.

5. A baseball pitching machine as recited in claim 1, further comprising a baseball feeder, wherein the baseball pitching machine is configured to rotate the baseball spinner and launcher toward the baseball feeder and have the baseball feeder feed a baseball into the baseball spinner and launcher.

6. A system for indexing, spinning and pitching a baseball, said system comprising: a controller; and a baseball pitching machine, said baseball pitching machine comprising a baseball spinner and launcher, said controller configured to send air to the baseball spinner and launcher such that the baseball is pitched from the baseball pitching machine, said baseball spinner and launcher comprising at least one spindle, said controller configured to control the at least one spindle to contact, index, and spin the baseball before sending air to the baseball spinner and launcher to pitch the baseball out of the baseball pitching machine.

7. A system as recited in claim 6, wherein the at least one spindle comprises a plurality of spindles, and wherein the controller is configured to separately extend and retract each of the plurality of spindles.

8. A system as recited in claim 6, wherein the at least one spindle comprises at least one pair of spindles, wherein a first spindle of the pair is driven and a second spindle of the pair is an idler.

9. A system as recited in claim 6, wherein the at least one spindle comprises a plurality of spindles, wherein the controller is configured to use at least one of the plurality of spindles to index the baseball and thereafter use at least one of the plurality of spindles to center the baseball in the core assembly and spin the baseball.

10. A system as recited in claim 6, further comprising a baseball feeder, wherein the controller is configured to rotate the baseball spinner and launcher toward the baseball feeder and have the ball feeder feed a baseball into the baseball spinner and launcher.

11. A system as recited in claim 6, wherein the controller is specifically configured to convert pitch data into specific commands which are provided to the baseball pitching machine causing the baseball pitching machine to replicate the pitch spin, speed, movement, trajectory and release point on which the pitch data is based and to deliver the pitch to a specified strike zone location.

12. A method of indexing, spinning and pitching a baseball, said method comprising: using at least one spindle to index and spin a baseball within a baseball pitching machine; retracting the at least one spindle; and using air to pitch the baseball from the baseball pitching machine.

\* \* \* \* \*